United States Patent
Onsen

(10) Patent No.: US 8,078,699 B2
(45) Date of Patent: Dec. 13, 2011

(54) SETTING A NETWORK ADDRESS FOR COMMUNICATING WITH A NETWORK DEVICE WHEN INSTALLING A DEVICE CONTROL PROGRAM

(75) Inventor: Takahiro Onsen, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 11/872,531

(22) Filed: Oct. 15, 2007

(65) Prior Publication Data

US 2008/0098098 A1    Apr. 24, 2008

(30) Foreign Application Priority Data

Oct. 20, 2006   (JP) ................. 2006-286887

(51) Int. Cl.
*G06F 15/177*   (2006.01)
(52) U.S. Cl. ........................................ 709/220
(58) Field of Classification Search .................... 709/220
See application file for complete search history.

(56) References Cited

U.S. PATENT DOCUMENTS

| | | | |
|---|---|---|---|
| 6,708,219 B1* | 3/2004 | Borella et al. ............... | 709/245 |
| 7,383,554 B2* | 6/2008 | Ozaki et al. .................. | 719/327 |
| 2003/0208691 A1* | 11/2003 | Smart et al. .................. | 713/201 |
| 2004/0111494 A1* | 6/2004 | Kostic et al. .................. | 709/220 |
| 2006/0067336 A1* | 3/2006 | Matsuda ....................... | 370/397 |
| 2006/0095924 A1* | 5/2006 | Inoue ........................... | 719/327 |

FOREIGN PATENT DOCUMENTS

| | | |
|---|---|---|
| JP | 2004-334571 | 11/2004 |
| JP | 2006-20262 | 1/2006 |
| JP | 2006-108801 | 1/2006 |

OTHER PUBLICATIONS

Japanese Office Action dated Sep. 9, 2011 issued during prosecution of related Japanese application No. 2006-286887.

* cited by examiner

*Primary Examiner* — Larry Donaghue
(74) *Attorney, Agent, or Firm* — Fitzpatrick, Cella, Harper & Scinto

(57) ABSTRACT

An information processing apparatus includes a search unit which searches for a network device having a function of communication by the first communication protocol and a network device having a function of communication by the second communication protocol, and a setting unit which, when a network device detected by the search unit is compliant with both the first and second communication protocols, sets a network address for communicating with the network device by selecting the network address from a network address in the format of the first communication protocol and a network address in the format of the second communication protocol in installing a device control program for the network device.

11 Claims, 14 Drawing Sheets

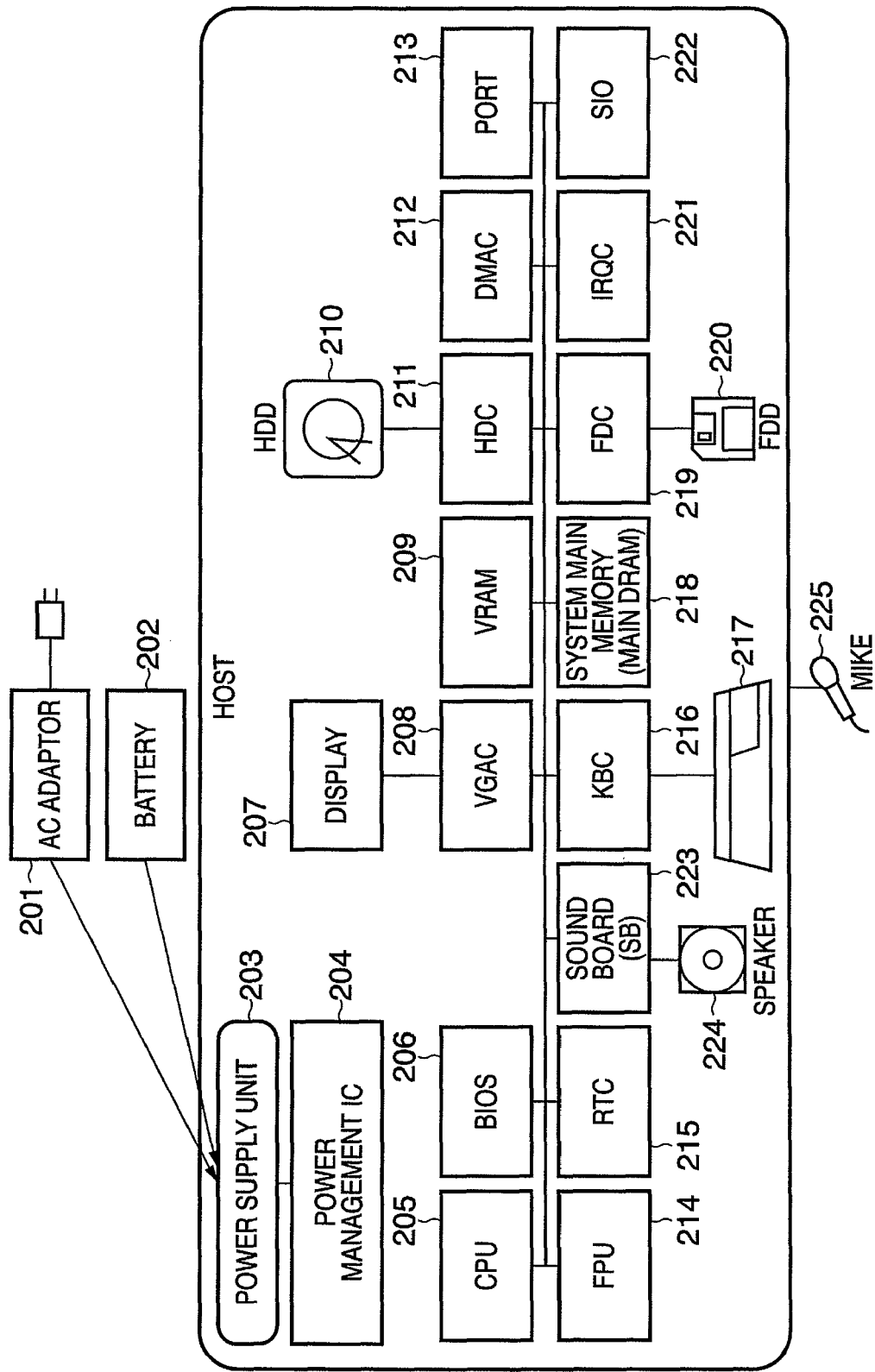

FIG. 3A

IPV4 DEVICE LIST    301

| INDEX | DEVICE NAME | PRINTER VENDOR / PRODUCT NAME | PRINTER INSTALLATION LOCATION | IP ADDRESS |
|---|---|---|---|---|
| 1 | AAAA | ○×COMPANY AAAA Type1 | 1F | 172.24.139.33 |
| 2 | BBBB | ○×COMPANY BBBB Type2 | 2F | 172.24.138.231 |

F I G. 3B

IPV6 DEVICE LIST 302

| INDEX | DEVICE NAME | PRINTER VENDOR / PRODUCT NAME | PRINTER INSTALLATION LOCATION | IP ADDRESS |
|---|---|---|---|---|
| 1 | BBBB | ○×COMPANY BBBB Type2 | 2F | 2006:0523:0000:1234: 0001:0002:0003:0004 |
| 2 | CCCC | ○×COMPANY CCCC Type1 | 3F | 2006:0523:0000:1234: 0001:0002:0003:08af |

FIG. 4

IPV4 / IPV6 DUAL STACK DEVICE INFORMATION LIST 401

| INDEX | DEVICE NAME | PRINTER VENDOR / PRODUCT NAME | PRINTER INSTAL-LATION LOCATION | DEVICE IDENTIFICATION INFORMATION | IPV4 ADDRESS | IPV6 ADDRESS | IPV4 INFORMATION ACQUISITION TIME | IPV6 INFORMATION ACQUISITION TIME |
|---|---|---|---|---|---|---|---|---|
| 1 | BBBB | ○× COMPANY BBBB Type2 | 2F | 111100001 | 172.24.138.231 | 2006:0523:0000:1234: 0001:0002:0003:0004 | 500msec | 1sec |

FIG. 5

IPV4 / IPV6 DUAL STACK DEVICE INFORMATION LIST

501

| INDEX | DEVICE NAME | PRINTER VENDOR / PRODUCT NAME | PRINTER INSTALLATION LOCATION | DEVICE IDENTIFICATION INFORMATION | IPV4 ADDRESS | IPV6 ADDRESS | IPV4 INFORMATION ACQUISITION TIME | IPV6 INFORMATION ACQUISITION TIME | CURRENT IP ADDRESS |
|---|---|---|---|---|---|---|---|---|---|
| 1 | BBBB | ○× COMPANY BBBB Type2 | 2F | 111100001 | 172.24.138.231 | 2006:0523:0000:1234: 0001:0002:0003:0004 | 500msec | 1sec | 172.24.138.231 |
| | | | | | | | | | |
| | | | | | | | | | |

FIG. 11

```
SELECTION OF PRINTER TO BE INSTALLED

1101——PRINTER LIST
      DEVICE NAME   PRODUCT NAME            IP ADDRESS
      AAAA          ○××COMPANY AAAA Type1   172.24.139.33
      BBBB          ○××COMPANY BBBB Type2   172.24.138.231, 2006:0523:0000:1234:0001:0002:0003:0004
      CCCC          ○××COMPANY CCCC Type1   2006:0523:0000:1234:0001:0002:0003:08af

[ NEXT ]    [ CANCEL ]
```

FIG. 12

| INDEX | DEVICE NAME | PRINTER VENDOR / PRODUCT NAME | PRINTER INSTALLATION LOCATION | IP ADDRESS (IPV6 ADDRESS) | SUPPORTED DRIVER |
|---|---|---|---|---|---|
| 1 | DDDD | ○×COMPANY DDDD | 3F | 2006:0523:0000:1234: 0001:0002:0003:0005 | PDL-A |
| 2 | DDDD | ○×COMPANY DDDD | 3F | 2006:0523:0000:1234: 0001:0002:0003:0006 | PDL-B |

SETTING A NETWORK ADDRESS FOR COMMUNICATING WITH A NETWORK DEVICE WHEN INSTALLING A DEVICE CONTROL PROGRAM

BACKGROUND OF THE INVENTION

1. Field of the Invention

The present invention relates to an information processing technique in a network system in which a plurality of communication protocols coexist.

2. Description of the Related Art

These days, with the prevalence of IPV6 (Internet Protocol Ver. 6), a network is formed, where IPV4 (Internet Protocol Ver. 4) and IPV6 coexist.

Devices (to be referred to as "IPV4 devices" hereinafter) compliant with only the IPV4 protocol and devices (to be referred to as "IPV6 devices" hereinafter) compliant with only the IPV6 protocol are connectable to a network environment where IPV4 and IPV6 coexist. In addition to IPV4 and IPV6 devices, devices (to be referred to as "dual stack devices" hereinafter) compliant with both IPV4 and IPV6 are connectable to the network environment where IPV4 and IPV6 coexist.

Each device communicates using the IPV4 or IPV6 protocol.

For example, IPV4 devices communicate with each other using IPV4. IPV6 devices communicate with each other using IPV6. A dual stack device communicates using IPV4 with a device which supports only IPV4, and using IPV6 with a device which supports only IPV6. A dual stack device can communicate with another dual stack device using either IPV4 or IPV6.

In a network environment where IPV4 and IPV6 coexist, an image forming system can be formed from a plurality of image forming apparatuses and a plurality of client PCs.

In the image forming system, a user activates an installation program on a client PC, and installs a control program (printer driver) in an image forming apparatus detected on the network.

The user designates printing by operating an application on the client PC. The printer driver generates print data, and transmits it to the image forming apparatus by either the designated IPV4 or IPV6 protocol. Then, the image forming apparatus prints.

For example, Japanese Patent Laid-Open No. 2004-334571 discloses a method of searching for and controlling a device in a network environment where a plurality of protocols coexist.

According to Japanese Patent Laid-Open No. 2004-334571, when a protocol conversion apparatus is detected on a network, it is determined whether the protocol conversion apparatus performs protocol conversion processing. If it is determined that the protocol conversion apparatus does not perform protocol conversion processing, the protocol conversion processing is activated.

When a client PC is a dual stack device in a network environment where IPV4 and IPV6 coexist, search for an image forming apparatus is executed twice using IPV4 and IPV6. If the image forming apparatus is a dual stack device, the device is detected twice for IPV4 and IPV6 and recognized as two different devices.

To solve this problem, Japanese Patent Laid-Open No. 2004-334571 adopts a protocol conversion apparatus. However, this problem cannot be solved in a network environment where no protocol conversion apparatus exists.

In a network environment where IPV4 and IPV6 coexist, dual stack devices preferably communicate with each other by properly using IPV4 or IPV6 depending on the situation.

However, the printer driver of a conventional image forming system and a printer driver installer do not comprise a means for setting a protocol optimum for a network environment. The user must manually set a protocol and IP address, as needed.

SUMMARY OF THE INVENTION

It is an object of the present invention to provide a technique capable of determining an IPV4/IPV6 dual stack device as one device even in a network environment where no protocol conversion apparatus exists, and IPV4 and IPV6 coexist.

It is another object of the present invention to provide a technique of allowing a printer driver and its installer, which run on a client PC, to determine a protocol used to communicate with a dual stack device, and automatically set a network address.

According to one aspect of the present invention, there is provided an information processing apparatus comprising:
  a search unit adapted to search for a network device having a function of communication by a first communication protocol and a network device having a function of communication by a second communication protocol; and
  a setting unit adapted to, when a network device detected by the search unit is compliant with both the first communication protocol and the second communication protocol, set a network address for communicating with the network device by selecting the network address from a network address in a format of the first communication protocol and a network address in a format of the second communication protocol in installing a device control program for the network device.

According to one aspect of the present invention, there is provided an information processing method comprising:
  a search step of causing a search unit to search for a network device having a function of communication by a first communication protocol and a network device having a function of communication by a second communication protocol; and
  a setting step of causing a setting unit to, when a network device detected by the search unit is compliant with both the first communication protocol and the second communication protocol, set a network address for communicating with the network device by selecting the network address from a network address in a format of the first communication protocol and a network address in a format of the second communication protocol in installing a device control program for the network device.

The present invention enables determining an IPV4/IPV6 dual stack device as one device even in a network environment where no protocol conversion apparatus exists, and IPV4 and IPV6 coexist.

A printer driver and its installer, which run on a client PC, can determine a protocol used to communicate with a dual stack device, and automatically set a network address.

Further features of the present invention will become apparent from the following description of exemplary embodiments (with reference to the attached drawings).

BRIEF DESCRIPTION OF THE DRAWINGS

FIG. 2 is a block diagram showing the internal arrangement of a client PC;

FIGS. 3A and 3B are tables each showing a device search list;

FIG. 4 is a table showing a dual stack device information list;

FIG. 5 is a table showing a dual stack device information list;

FIG. 11 is a view illustrating a device list window displayed by the printer driver installer; and FIG. 12 is a table illustrating an IPV6 device list.

DESCRIPTION OF THE EMBODIMENTS

Embodiments of the present invention will be described below. Individual embodiments to be described below will serve to understand various concepts including the superordinate concept, intermediate concept, and subordinate concept of the present invention. The technical scope of the invention is determined by the appended claims and is not limited to the individual embodiments to be described below.

First Embodiment

Description of System

Figure 1:
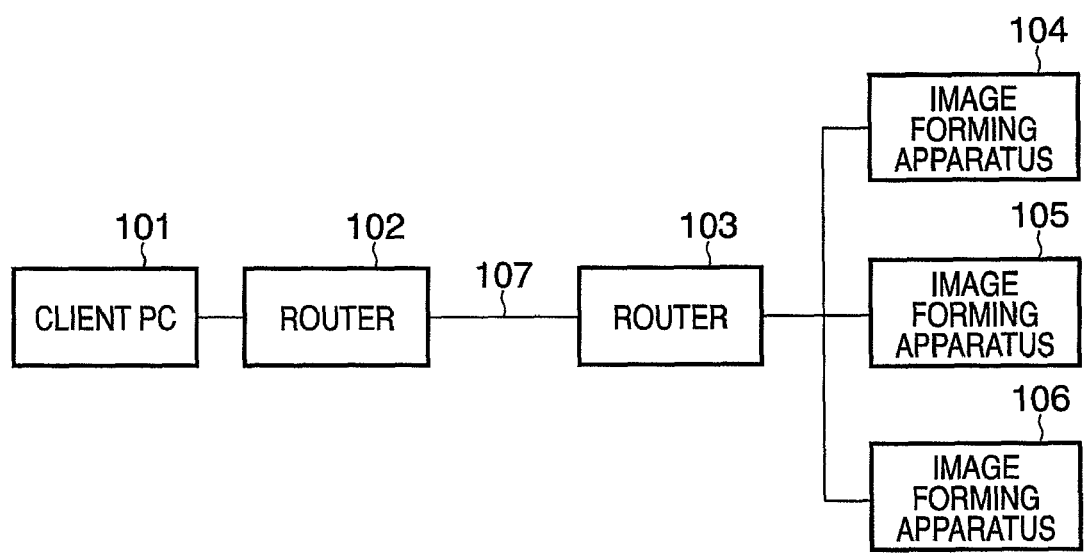
FIG. 1 is a block diagram showing a configuration of an image forming system according to an embodiment of the present invention.

FIG. 1 is a block diagram showing a configuration of an image forming system according to the first embodiment of the present invention. As shown in FIG. 1, each apparatus which builds the image forming system is connected to a network 107 where IPV4 and IPV6 coexist. The network 107 may be formed from one or a plurality of systems.

A client PC 101 is an IPV4/IPV6 dual stack information processing apparatus, and has a function of communicating by IPV4 or IPV6 with image forming apparatuses 104, 105, and 106 connected to the network 107.

The client PC 101 has two network addresses (e.g., IP addresses: this also applies to the following description) for specifying the client PC 101 in IPV4 communication and IPV6 communication, respectively, when connected to the network 107.

In the first embodiment, the IP address of the client PC 101 for IPV4 is 172.24.139.30, and that for IPV6 is 2006:0523:0000:1234:0001:0002:0003:0002.

The client PC 101 connects to the image forming apparatuses 104, 105, and 106 on the network 107 via routers 102 and 103. The routers 102 and 103 are network routing devices having a function of transferring electronic data by the IPV4 and IPV6 protocols.

The image forming apparatus 104 is a network device (IPV4 device) having a function of communication by the IPV4 protocol. The image forming apparatus 104 has a function of communicating with the client PC 101 by the IPV4 protocol, receiving electronic data, and executing print processing. The image forming apparatus 104 has a network address (IP address: IPV4 address) for specifying the image forming apparatus 104 in IPV4 communication when connected to the network 107. In the first embodiment, the IPV4 address of the image forming apparatus 104 is 172.24.139.33.

The image forming apparatus 105 is a network device (IPV4/IPV6 dual stack device) having a function of communication by the IPV4 and IPV6 protocols. The image forming apparatus 105 has a function of communicating with the client PC 101 by the IPV4 or IPV6 protocol, receiving electronic data, and executing print processing. The image forming apparatus 105 has a security printing function using an IPV6 cipher communication protocol (IPSEC) in IPV6 protocol communication.

The image forming apparatus 105 has network addresses (IP addresses (IPV4 and IPV6 addresses)) for specifying the image forming apparatus 105 in IPV4 communication and IPV6 communication, respectively, when connected to the network 107.

In the first embodiment, the IPV4 address of the image forming apparatus 105 is 172.24.139.35, and its IPV6 address is 2006:0523:0000:1234:0001:0002:0003:0004.

The image forming apparatus 106 is a network device (IPV6 device) having a function of communication by the IPV6 protocol. The image forming apparatus 106 has a function of communicating with the client PC 101 by the IPV6 protocol, receiving electronic data, and executing print processing.

The image forming apparatus 106 has a network address (IP address: IPV6 address) for specifying the image forming apparatus 106 in IPV6 communication when connected to the network 107.

In the first embodiment, the IPV6 address of the image forming apparatus 106 is 2006:0523:0000:1234:0001:0002:0003:08af.

FIG. 2 is a block diagram showing the internal arrangement of the client PC 101. An AC adaptor 201 and battery 202 are attached externally as the driving source of the client PC 101.

The client PC 101 comprises a power supply unit 203, power management IC 204, CPU 205, BIOS 206, and display 207 formed from an LCD.

The client PC 101 comprises a video controller (VGAC) 208, video memory (VRAM) 209, hard disk drive (HDD) 210, and hard disk controller (HDC) 211. The client PC 101 also comprises a DMA controller (DMAC) 212, port (PORT) 213, floating-point processor (FPU) 214, and real time clock (RTC) 215. The client PC 101 comprises a keyboard controller (KBC) 216, keyboard 217, system main memory (MAIN DRAM) 218, and flexible disk controller (FDC) 219. The client PC 101 comprises a flexible disk drive (FDD) 220, interrupt controller (IRQC) 221, and serial interface (SIO) 222. Further, the client PC 101 comprises a soundboard (SB) 223, loudspeaker 224, and microphone 225.

The port 213 incorporates a dual stack network port for connecting to the network 107 by the IPV4 and IPV6 protocols.

The hard disk drive (HDD) 210 of the client PC 101 stores software programs such as an OS (Operating System), various applications, and device drivers. The CPU 205 executes these software programs. Various applications include an installer serving as a program which controls the installation function. The installer controls installation processing by instructing the OS to move a file or write in a registry.

The user can set the image forming system and execute print processing by operating various software programs stored in the hard disk drive (HDD) 210 of the client PC 101.

(Description of Security Printing)

An IPV6 network environment supports a cipher communication protocol (IPSEC: Security Architecture for Internet Protocol) as a standard protocol. The image forming system according to the first embodiment has the security printing function using the cipher communication protocol (IPSEC).

More specifically, a user having the security printing right transmits print data from the client PC 101 to an image forming apparatus using the cipher communication protocol (IPSEC). In transmission, the user who is to transmit print data is authenticated, and an IP packet is encrypted to transmit print data. The IP packet is encrypted using an encryption key.

In the image forming system according to the first embodiment, the user can set his security printing right using a user right setting program running on the client PC 101. The security printing right can be set for each image forming apparatus in which a printer driver is installed.

Figure 6:
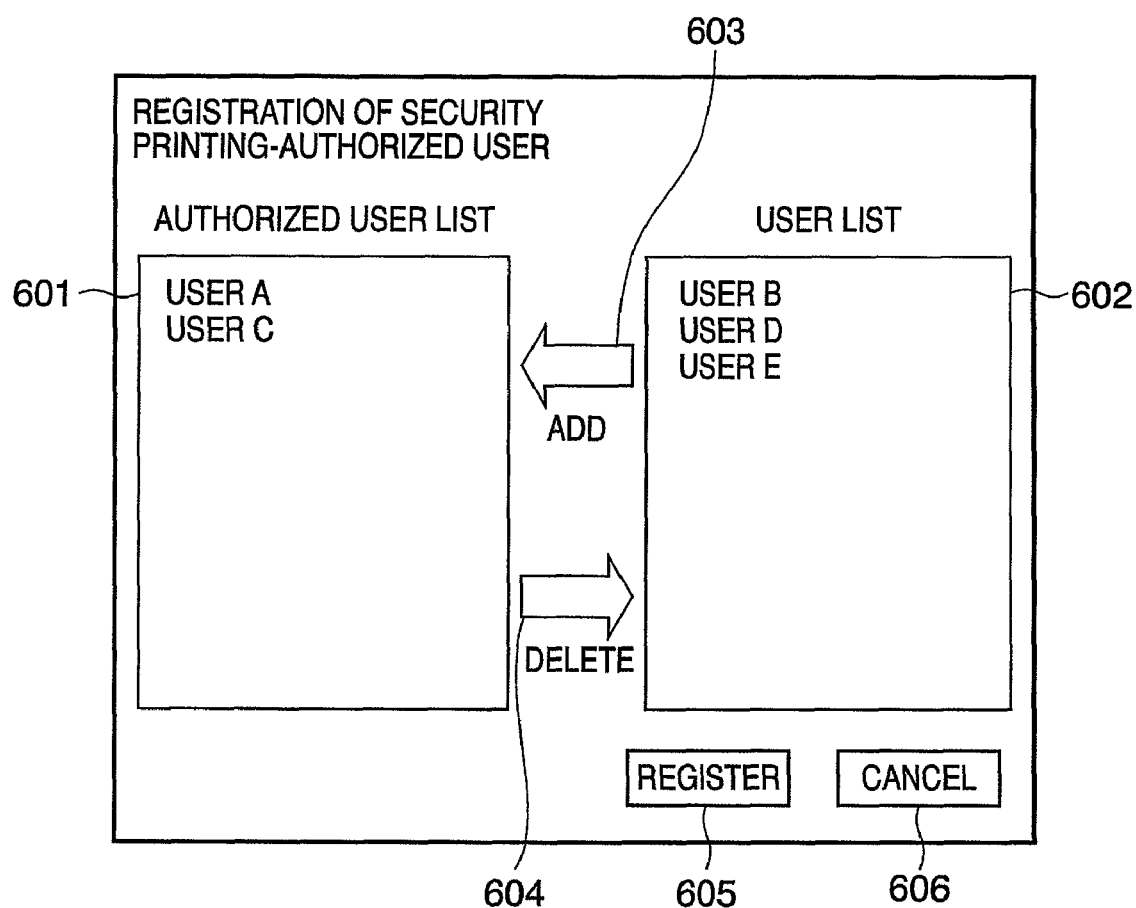
FIG. 6 is a view illustrating a setting window displayed on a display by a user right setting program.

FIG. 6 is a view illustrating a setting window displayed on the display 207 by the user right setting program.

An authorized user list 601 is a display area for displaying a list of security printing-authorized users. A user list 602 is a display area for displaying a list of all user accounts registered in the OS. An add button 603 is used to add a user selected from the user list 602 to the security printing-authorized user list 601. A delete button 604 is used to delete a user selected from the authorized user list 601. A user deleted from the authorized user list 601 is returned to the user list 602. A register button 605 is used to give the security printing right to a user displayed in the authorized user list. When the register button 605 is pressed, the security printing right is given to a user displayed in the authorized user list 601. A cancel button 606 is used to end the user right setting program.

The sequence of processing by the user right setting program will be explained. The processing of the user right setting program is executed under total control of the CPU 205 of the client PC 101.

First, the user activates the user right setting program in the client PC 101. The user right setting program is associated with each image forming apparatus in which a printer driver is installed. The user right setting program creates a list of all user accounts registered in the OS, and displays the user list 602 on the display 207.

The user selects, from users in the user list 602, a user to be authorized to perform security printing. A target user can be selected with the keyboard 217 or an input device such as a mouse (not shown). While selecting a user to be authorized to perform security printing, the user clicks the add button 603 with the mouse or the like. Then, the user right setting program moves the user selected from the user list 602 to the authorized user list 601. At this stage, the user moved to the authorized user list 601 becomes a candidate to be given the security printing right.

The user clicks the register button 605 with the mouse or the like. In response to this, the user right setting program gives the security printing right to the user displayed in the authorized user list 601.

The user right setting program transmits information on the user having the security printing right to an image forming apparatus, and stores the user information in the hard disk 210 of the client PC 101.

The client PC 101 and the image forming apparatus which has received the user information exchange encryption keys used to encrypt the IP packet of the cipher communication protocol (IPSEC).

The image forming apparatus stores the user information transmitted from the client PC 101 in a storage device such as a hard disk (not shown). After that, the client PC 101 and the image forming apparatus which has received the user information permit encrypted communication of print data in response to a print request from the user registered in the user information.

(Sequence of Dual Stack Device Determination Processing)

Figure 8A:
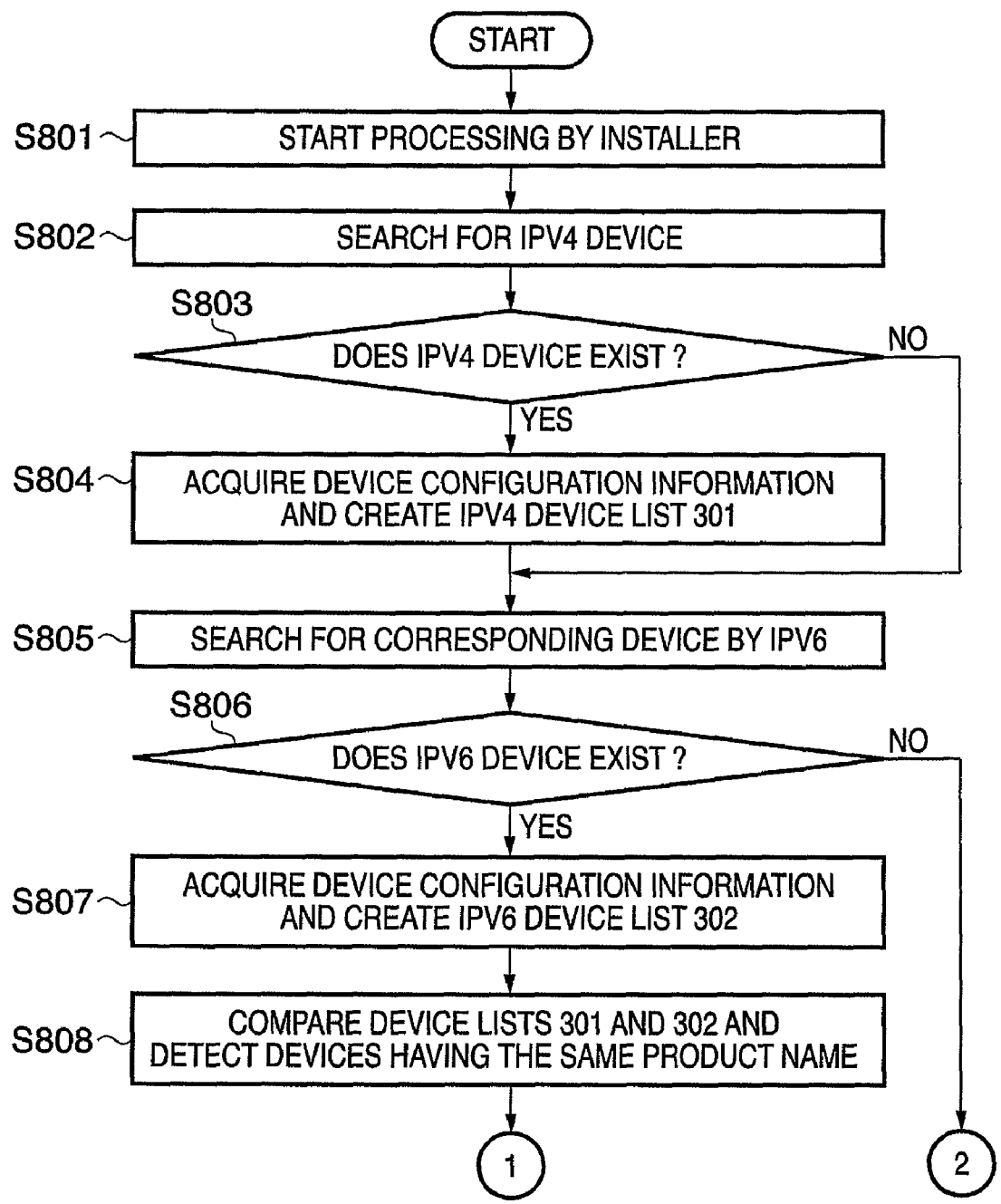
FIGS. 8A and 8B are flowcharts for explaining the sequence of processing of searching for an image forming apparatus connected to a network by a printer driver installer running on the client PC.
Figure 8B:
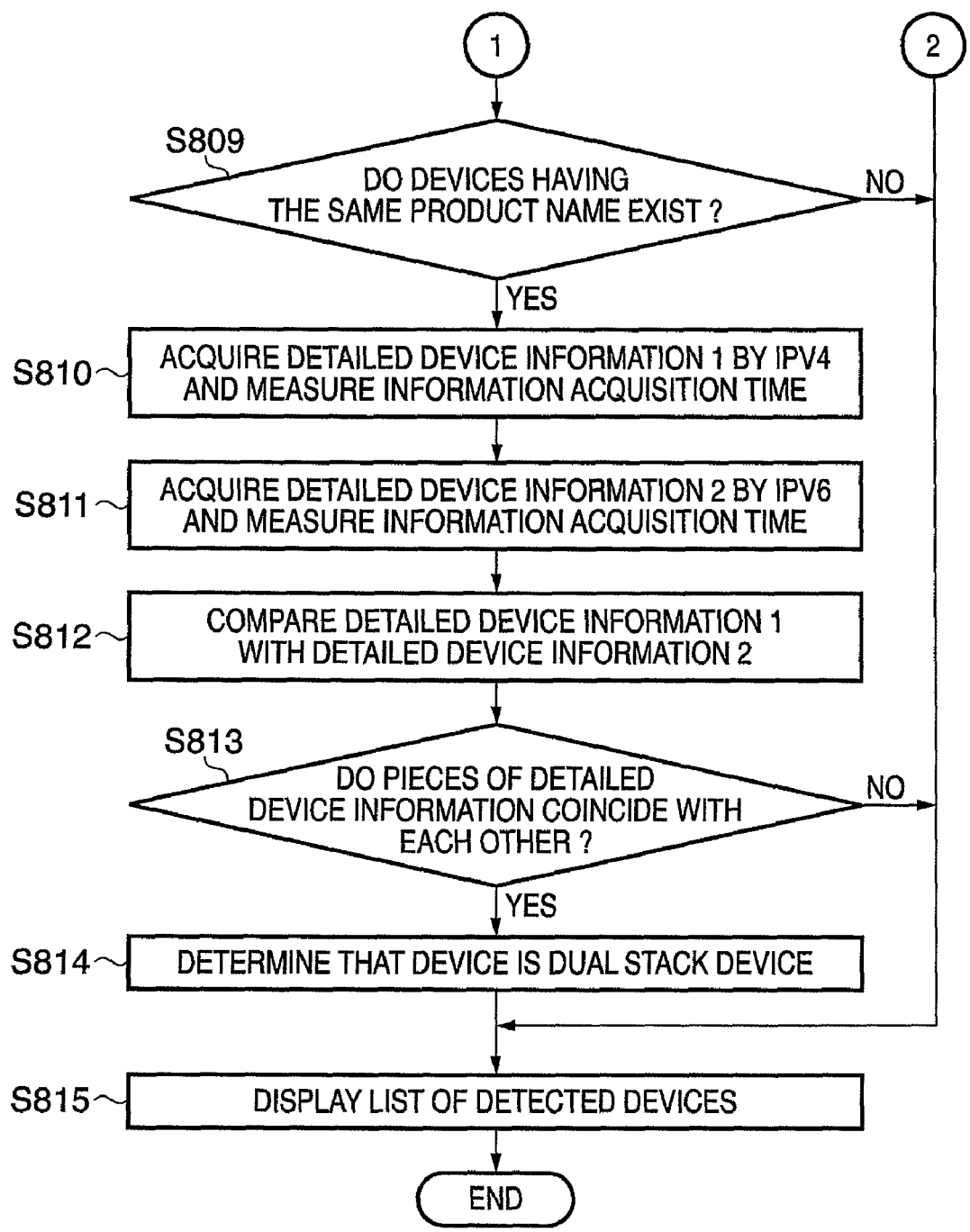

FIGS. 8A and 8B are flowcharts for explaining the sequence of processing of searching for an image forming apparatus connected to the network 107 by a printer driver installer (to be also simply referred to as an "installer" hereinafter) running on the client PC 101. Processing of determining a dual stack device from the image forming system built in a network environment where IPV4 and IPV6 coexist will be explained with reference to FIGS. 8A and 8B. This processing is executed under total control of the CPU 205 of the client PC 101.

The user activates the printer driver installer in the client PC 101. Then, in step S801 of FIG. 8A, the installer starts processing.

In step S802, the installer uses the IPV4 protocol as the first communication protocol to search the network 107 for an IPV4 device having a function of communication by the IPV4 protocol.

For example, an IPV4 device can be searched by the following procedures.

The installer detects devices by transmitting HTTP M-SEARCH packets defined by Universal Plug and Play Device Architecture and receiving response packets.

The installer broadcasts, to the detected devices, the SNMP Get request of Simple Network Management Protocol (SNMP) implemented on the IPV4 protocol stack.

An IPV4 device sends back SNMP response data. The installer receives device configuration information, acquiring the device configuration information of the IPV4 device.

These search procedures are exemplary ones, and the gist of the present invention is not limited to this example. The present invention may adopt another device search method.

In step S803, the installer analyzes the device configuration information contained in the SNMP response data sent back from the IPV4 device. The installer determines whether to install a printer driver for the IPV4 device which has sent back the response data. The installer determines whether an IPV4 device whose printer driver is to be installed exists in the image forming system.

In general, a response to an SNMP Get request contains the following pieces of device configuration information (MIB information). The installer can analyze these pieces of information to determine whether to install a printer driver for the device.

PrinterMakeAndModel: printer vendor/product name
PrinterName: printer name
PrinterLocation: printer installation location
IPAddress: printer IP address
MACAddress: printer MAC address
SupprotedPDL: supported page description language
SupportedPrintProtocol: supported print protocol For example, when a device and printer driver hold the same the printer vendor/product name and the same supported page description language, the installer determines that the printer driver is to be installed for the device.

In the first embodiment, the installer determines that the image forming apparatuses 104 and 105 are IPV4 devices whose printer drivers are to be installed.

If an IPV4 device whose printer driver is to be installed exists on the network 107 in step S803 (YES in S803), the process advances to step S804. If there is no IPV4 device whose printer driver is to be installed (NO in S803), the process advances to step S805.

In step S804, the installer acquires device configuration information of the IPV4 device whose printer driver is to be installed. The installer creates an IPV4 device list 301 shown in FIG. 3A, and stores it in the hard disk 210 of the client PC 101. Thereafter, the process advances to step S805.

At this time, the IPV4 device list 301 stored in the hard disk 210 includes the index number, device name, printer vendor/product name, printer installation location, and IP address of the detected IPV4 device.

In step S805, the installer uses the IPV6 protocol as the second communication protocol to search the network for an IPV6 device.

The search method is the same as that for an IPV4 device in step S802 except for the IPV6 protocol is used.

In step S806, based on device configuration information analyzed by the same method as in step S803, the installer determines whether an IPV6 device whose printer driver is to be installed exists in the image forming system.

In the first embodiment, the installer determines that the image forming apparatuses 105 and 106 are IPV6 devices whose printer drivers are to be installed.

If an IPV6 device whose printer driver is to be installed exists on the network 107 in step S806 (YES in S806), the process advances to step S807. If there is no IPV6 device whose printer driver is to be installed (NO in S806), the process advances to step S815.

In step S807, the installer acquires device configuration information of the IPV6 device whose printer driver is to be installed. The installer creates an IPV6 device list 302 shown in FIG. 3B, and stores it in the hard disk 210 of the client PC 101. Thereafter, the process advances to step S808.

At this time, the IPV6 device list 302 stored in the hard disk 210 includes the index number, device name, printer vendor/product name, printer installation location, and IP address of the detected IPV6 device.

In step S808, the installer compares the IPV4 device list 301 with the IPV6 device list 302, and detects image forming apparatuses having the same item in the two device lists based on the comparison result. For example, the installer can detect image forming apparatuses having the same printer vendor/product name item as an item contained in the device lists. The device list item used for comparison is not limited to the printer vendor/product, and the device lists can also be compared based on the device name. In the first embodiment, devices having the same printer vendor/product name are detected from the two device lists.

If the installer determines in step S809 that there are image forming apparatuses having the same printer vendor/product name (YES in S809), the process advances to step S810. If the installer determines that there are no image forming apparatuses having the same printer vendor/product name (NO in S809), the process advances to step S815.

In S810, the installer issues a detailed device information acquisition command to the image forming apparatuses having the same printer vendor/product name by using the IPV4 protocol. The installer acquires, from the image forming apparatuses having the same printer vendor/product name, detailed device information 1 for specifying in detail the image forming apparatus. The installer stores acquired detailed device information 1 in the hard disk 210 of the client PC 101. In general, detailed device information 1 includes the device identification information (device serial number), memory capacity, hard disk capacity, and user account of an image forming apparatus.

At this time, the installer measures the time (information acquisition time) until it acquires detailed device information after issuing a detailed device information acquisition command. The installer stores the time as an IPV4 information acquisition time in the hard disk 210.

In S811, the installer issues a detailed device information acquisition command to the image forming apparatuses having the same printer vendor/product name by using the IPV6 protocol. The installer acquires, from the image forming apparatuses having the same printer vendor/product name, detailed device information 2 for specifying in detail the image forming apparatus. The installer stores acquired detailed device information 2 in the hard disk 210 of the client PC 101. Detailed device information 2 includes the device identification information (device serial number), memory capacity, hard disk capacity, and user account of an image forming apparatus, similar to detailed device information 1. The installer measures the time until it acquires detailed device information after issuing a detailed device information acquisition command. The installer stores the time as an IPV6 information acquisition time in the hard disk 210.

In step S812, the installer compares detailed device information 1 which has been acquired by the IPV4 protocol and stored in step S810 with detailed device information 2 which has been acquired by the IPV6 protocol and stored in step S811. Detailed device information 1 and detailed device information 2 can also be compared using the result of collating device identification information (device serial number) or user accounts contained in these pieces of information.

In step S813, the installer determines whether detailed device information 1 by the IPV4 protocol coincides with detailed device information 2 by the IPV6 protocol. If these pieces of information coincide with each other (YES in S813), the process advances to step S814.

If the installer determines in step S813 that these pieces of detailed device information do not coincide with each other (NO in S813), the process advances to step S815.

In step S814, the installer determines that a device whose detailed device information 1 by the IPV4 protocol and detailed device information 2 by the IPV6 protocol coincide with each other is an IPV4/IPV6 dual stack device. The installer creates a dual stack device information list 401 shown in FIG. 4 from the device configuration information and detailed device information of the IPV4/IPV6 dual stack device. The installer stores the created dual stack device information list 401 in the hard disk 210 of the client PC 101.

In the first embodiment, the installer determines that the image forming apparatus 105 is an IPV4/IPV6 dual stack device displayed (to be also simply referred to as a "dual stack device" hereinafter).

The dual stack device information list 401 includes an index number, device name, printer vendor/product name, printer installation location, and device identification number. An IP address in the IPV4 device list 301 is contained as an IPV4 address in the dual stack device information list 401. An IP address in the IPV6 device list 302 is contained as an IPV6 address in the dual stack device information list 401.

An IPV4 information acquisition time and IPV information acquisition time are contained as detailed device information acquisition times for the IPV4 and IPV6 protocols in the dual stack device information list 401.

In step S815, the installer creates a detected device list window shown in FIG. 11, and displays a list of detected image forming apparatuses on the display 207 of the client PC

101. A printer list 1101 displays the device name, product name, and IP address of each detected image forming apparatus.

A device name "AAAA" in the printer list 1101 corresponds to the image forming apparatus 104 serving as an IPV4 device. A device name "BBBB" corresponds to the image forming apparatus 105 serving as a dual stack device. A device name "CCCC" in the printer list 1101 corresponds to the image forming apparatus 106 serving as an IPV6 device.

(Sequence of Automatic IP Address Setting Processing)

Processing of automatically setting an IP address used when the installer communicates with a network device in installing a device control program (printer driver) will be described.

Figure 9:
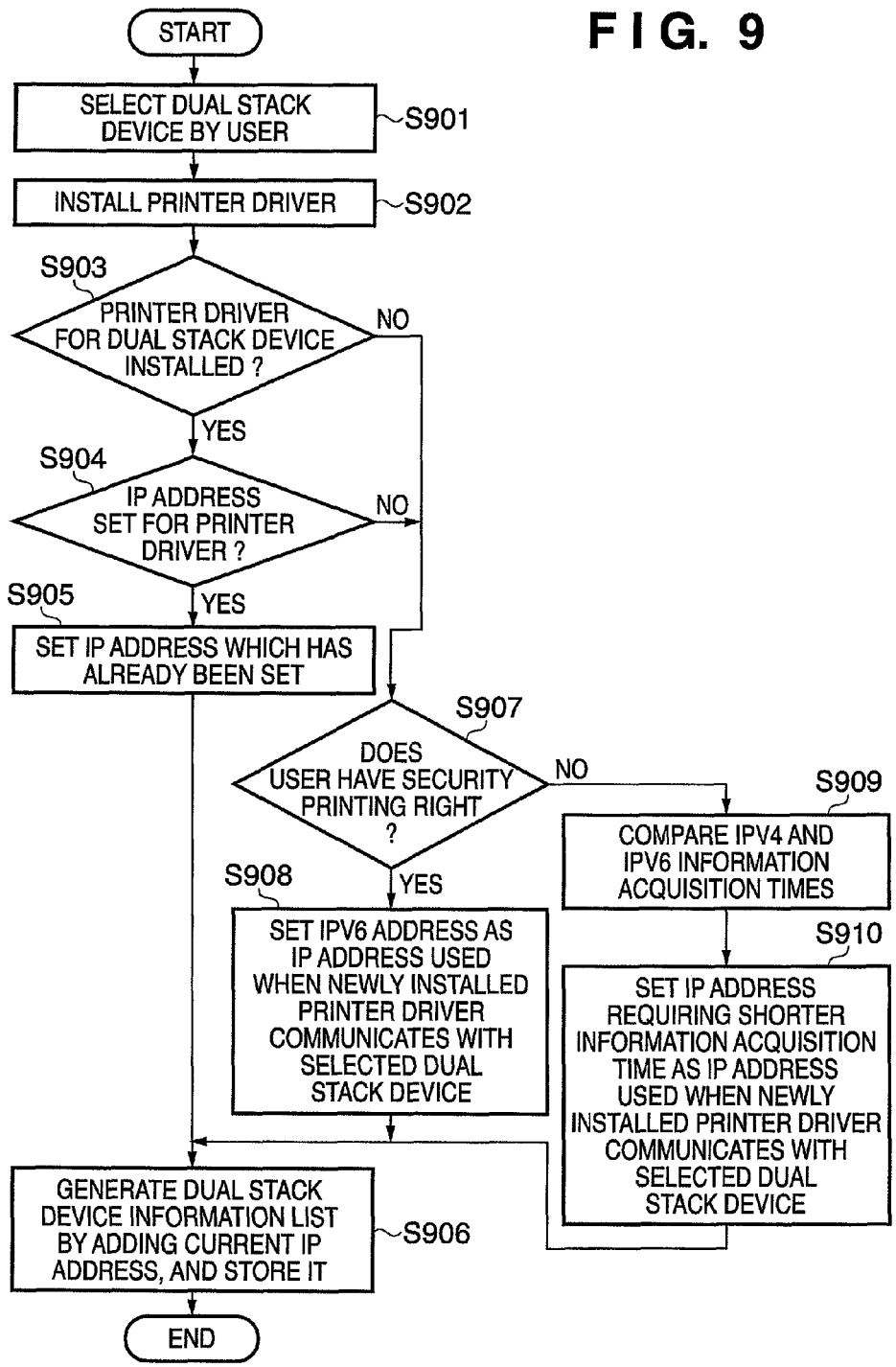
FIG. 9 is a flowchart for explaining the sequence of processing of automatically setting an IP address used when an installer running on the client PC installs a printer driver for a dual stack device and communicates with a network device.

FIG. 9 is a flowchart for explaining the sequence of processing of automatically setting an IP address used when the installer running on the client PC 101 installs a printer driver for a dual stack device and communicates with a network device.

The installer executes this processing under total control of the CPU 205 of the client PC 101. In step S901, the user selects a dual stack device. That is, the user selects the device name "BBBB" (image forming apparatus 105) in the window of the printer list 1101 in FIG. 11 in the client PC 101.

In step S902, the installer installs a printer driver for the image forming apparatus 105 in the client PC 101.

In step S903, the installer determines whether another PDL (Printer Definition Language) printer driver for the image forming apparatus 105 serving as a dual stack device has been installed in the client PC 101.

If the installer determines in step S903 that another PDL printer driver has been installed (YES in S903), the process advances to step S904. The installer determines whether an IP address has been set for communication between the installed PDL printer driver and the image forming apparatus 105. If the installer determines in S904 that an IP address has been set (YES in S904), the process advance to step S905. The installer sets the set IP address as an IP address for the newly installed printer driver.

If another PDL printer driver has not been installed (NO in S903), or no IP address has been set for another PDL printer driver in S904 (NO in S904), the process advances to S907.

In step S907, the installer acquires user information for which the printer driver is installed, and determines whether the user has security printing right.

If the installer determines in step S907 that the user has the security printing right (YES in S907), the process advances to step S908. In step S908, the installer refers to the IPV4/IPV6 dual stack device information list 401 stored in the client PC 101. The installer acquires an IPV6 address from the IPV4/IPV6 dual stack device information list 401. The installer sets the IPVG address as an IP address used when the newly installed printer driver communicates with the selected dual stack device (image forming apparatus 105). The set IP address will be called a current IP address.

If the installer determines in step S907 that the user does not have the security printing right (NO in S907), the process advances to step S909.

In S909, the installer compares the IPV4 information acquisition time with the IPV6 information acquisition time by referring to the IPV4/IPV6 dual stack device information list 401 stored in the client PC 101.

In S910, the installer determines a protocol requiring a shorter information acquisition time based on the comparison result in S909.

The installer sets an IP address requiring a shorter information acquisition time as an IP address used when the newly installed printer driver communicates with the selected dual stack device (image forming apparatus 105). The set IP address will be called a current IP address.

In S906, the installer generates a dual stack device information list 501 (FIG. 5) by adding, to the dual stack device information list 401, the current IP address set for the installed printer driver. The installer stores the generated dual stack device information list 501 (FIG. 5) in the hard disk 210 of the client PC 101.

(Sequence of IP Address Setting Processing when Security Printing is Valid)

The sequence of setting an IP address used when the user validates security printing and a printer driver communicates with a dual stack device will be described with reference to FIGS. 7 and 10.

Figure 10:
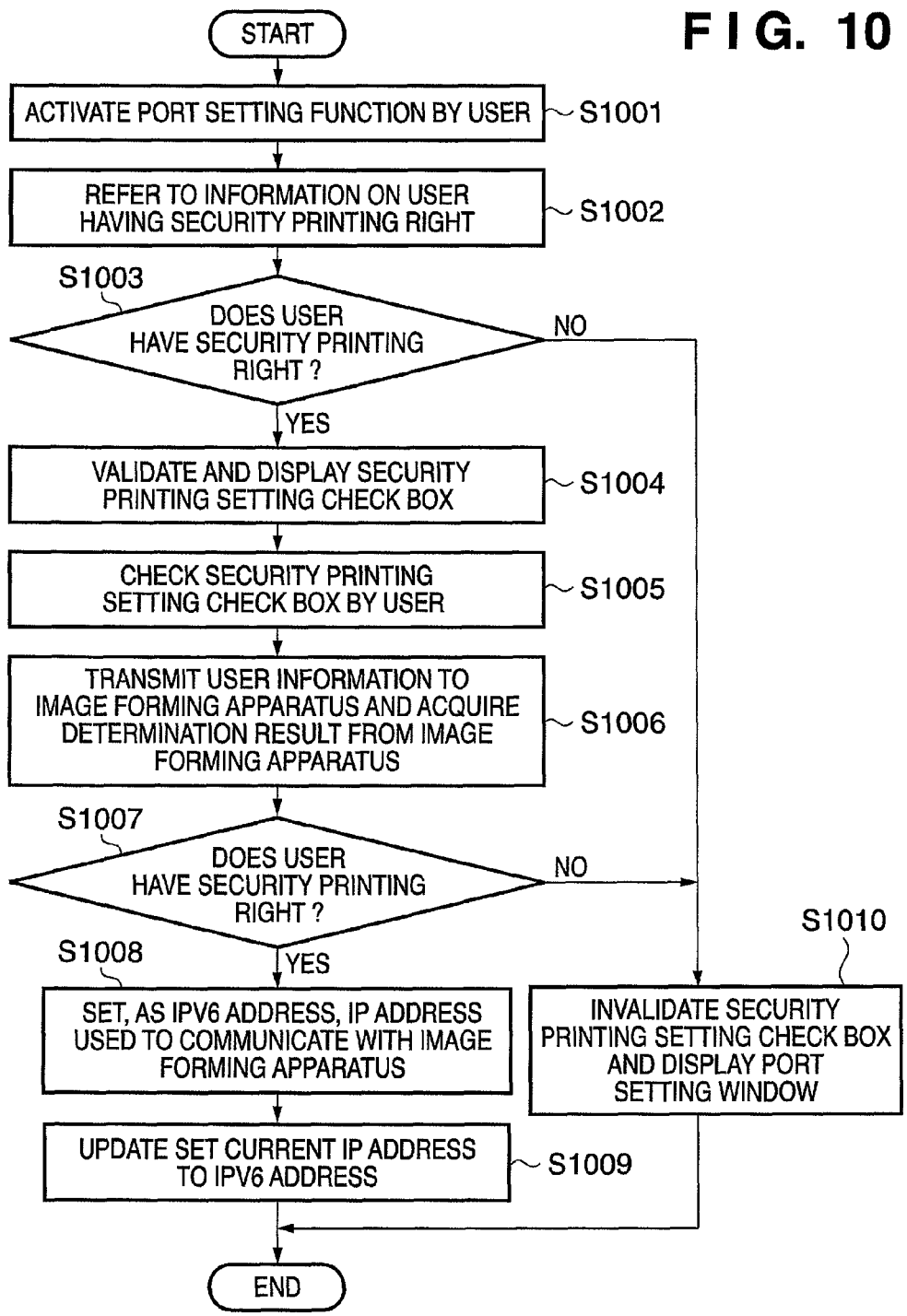
FIG. 10 is a flowchart for explaining the sequence of processing of automatically setting an IP address used when a printer driver running on the client PC communicates with a dual stack device in executing security printing.

FIG. 10 is a flowchart for explaining the sequence of processing of automatically setting an IP address used when a printer driver running on the client PC 101 communicates with a dual stack device in executing security printing. This processing is executed under total control of the CPU 205 of the client PC 101.

In step S1001, the user activates the port setting function of a printer driver. The hard disk 210 temporarily stores information on the user who has activated the port setting function.

In step S1002, the printer driver refers to user information which is stored in the client PC 101 and has the security printing right. In step S1003, the printer driver determines whether the user who has activated the port setting function has the security printing right.

If the printer driver determines in step S1003 that the user who has activated the port setting function has the security printing right (YES in S1003), the process advances to step S1004. If the printer driver determines in step S1003 that the user who has activated the port setting function does not have the security printing right (NO in S1003), the process advances to step S1010.

Figure 7:
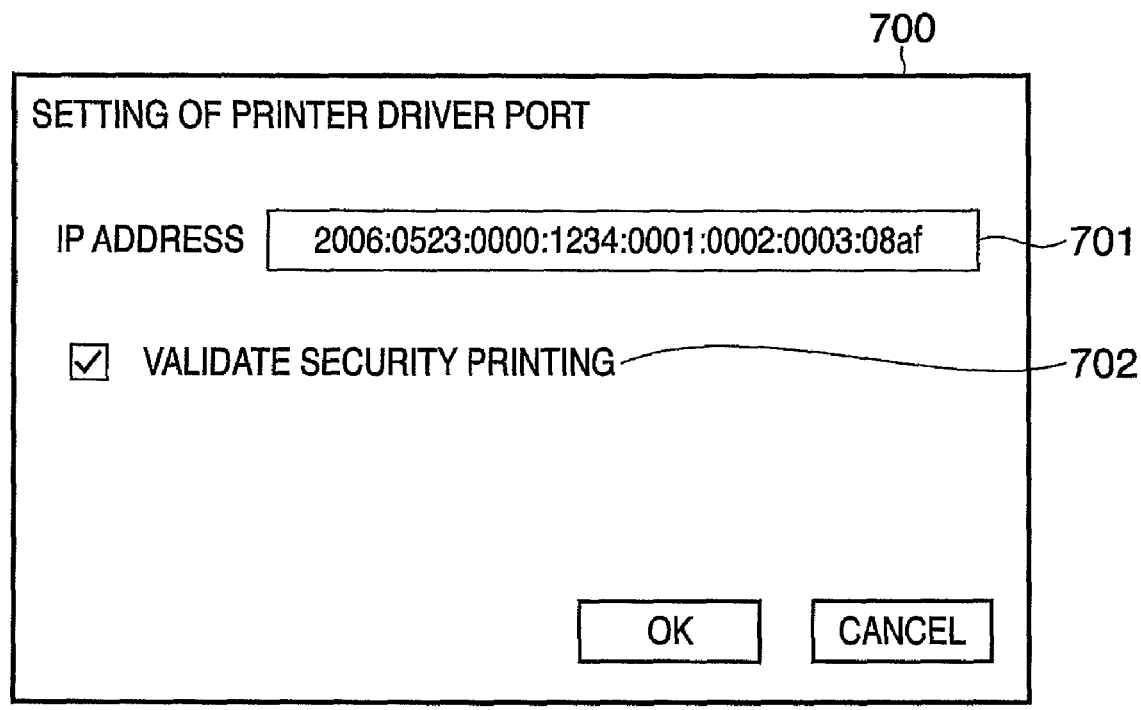
FIG. 7 is a view illustrating a port setting window displayed by a printer driver.

In step S1004, the printer driver displays a port setting window 700 shown in FIG. 7 on the display 207. The port setting window 700 has an IP address setting text box 701 and security printing setting check box 702. When the user has the security printing right, the security printing setting check box 702 is validated and displayed in the port setting window 700.

In step S1005, the user checks the security printing setting check box 702.

In step S1006, the printer driver transmits user information to an image forming apparatus, and acquires a determination result based on user information from the image forming apparatus. The image forming apparatus compares the received user information with user information stored in the image forming apparatus, and determines whether the user is registered as one having the security printing right. If the received user information coincides with the user information stored in the image forming apparatus, the image forming apparatus determines that the user has the security printing right. If these pieces of information do not coincide with each other, the image forming apparatus determines that the user does not have the security printing right. The image forming apparatus transmits this determination result to the client PC 101.

If the printer driver of the client PC determines in step S1007 on the basis of the determination result transmitted from the image forming apparatus that the user has the security printing right (YES in S1007), the process advances to step S1008. If the printer driver determines that the user does not have the security printing right (NO in S1007), the process advances to step S1010.

In step S1008, the printer driver sets, as an IPV6 address, an IP address used to communicate with the image forming apparatus.

In step S1009, the printer driver updates (overwrites) the current IP address in the dual stack device information list 501 to the set IPV6 address, and stores the updated IP address in the hard disk 210. Thereafter, encrypted communication using the cipher communication protocol (IPSEC) is executed in print processing by the user having the security printing right.

If the printer driver determines in step S1003 or S1007 that the user does not have the security printing right, the process advances to step S1010.

In step S1010, the printer driver displays the port setting window 700 on the display 207 while invalidating the security printing setting check box 702 (no input is accepted from the check box). At this time, the user cannot validate security printing.

The first embodiment enables determining an IPV4/IPV6 dual stack device as one device even in a network environment where no protocol conversion apparatus exists, and IPV4 and IPV6 coexist.

In addition, the first embodiment allows a printer driver and its installer, which run on a client PC, to determine a protocol used to communicate with a dual stack device, and automatically set a network address.

Second Embodiment (Example of Device Having IPV6 Addresses)

Each of IPV6 devices and IPV4/IPV6 dual stack devices can have a plurality of IPV6 addresses. An image forming apparatus can have an IPV6 address for each supported PDL.

For example, when an image forming apparatus (device name "DDDD") serving as an IPV6 device supports two page description languages (PDL-A and PDL-B), it has two IPV6 addresses for the respective PDLs.

An image forming apparatus 106 has 2006:0523:0000:1234:0001:0002:0003:0005 as an IPV6 address for PDL-A.

The image forming apparatus 106 has 2006:0523:0000:1234:0001:0002:0003:0006 as an IPV6 address for PDL-B. An image forming apparatus having a plurality of IPV6 addresses will also be called a "multi-IPV6 device".

When an image forming apparatus having a plurality of IPV6 addresses is connected to a network, a printer driver installer and printer driver search a network 107 for a multi-IPV6 device and set a proper IPV6 address.

More specifically, the installer searches for a device by IPV6 and acquires device configuration information from an IPV6 device. The device configuration information includes supported PDL information in addition to a printer vendor/product name and the like.

The installer generates IPV6 device lists 1201 and 1202 shown in FIG. 12, and stores them in a hard disk 210 of a client PC 101. The printer driver installer issues a detailed device information acquisition command to a device having a single printer vendor/product name ("DDDD" in FIG. 12) and different PDL names (PDL-A and PDL-B). Then, the installer acquires detailed information of the image forming apparatus (device "DDDD").

The detailed information includes the PDL names of the image forming apparatus and IPV6 addresses 1203 corresponding to the respective PDLs.

When different IP addresses (IPV6 addresses) are provided in correspondence with supported drivers for a single device name (DDDD), the installer determines that the device name (DDDD) represents a multi-IPV6 device. The hard disk 210 of the client PC 101 stores multi-IPV6 device information shown in FIG. 12.

If the user selects a multi-IPV6 device as a device whose printer driver is to be installed, the installer installs the printer driver. At this time, the installer refers to the multi-IPV6 device information to set an IPV6 address corresponding to a PDL name as an IP address used when the printer driver communicates with the multi-IPV6 device.

For example, when the user executes installation of PDL-A, an IP address (IPV6) 1204 associated with PDL-A is set as an IP address used to communicate with the multi-IPV6 device.

The second embodiment enables determining an IPV4/IPV6 dual stack device as one device even in a network environment where no protocol conversion apparatus exists, and IPV4 and IPV6 coexist.

Further, the second embodiment allows a printer driver and its installer, which run on a client PC, to determine a protocol used to communicate with a dual stack device, and automatically set a network address.

Other Embodiments

The object of the present invention is also achieved by supplying a storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs some or all of actual processes based on the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-286887, filed Oct. 20, 2006, which is hereby incorporated by reference herein in its entirety.

What is claimed is:

1. An information processing apparatus comprising:
   a first search unit constructed to search for a network device which has a function of communication by a first communication protocol and to which a network address has been set, wherein the first search unit performs the search based on the first communication protocol;
   a second search unit constructed to search for a network device which has a function of communication by a second communication protocol and to which a network address has been set, wherein the second search unit performs the search based on the second communication protocol, and wherein the second communication protocol has a cipher communication function;

a determination unit constructed to determine, when device specification information of the network device searched for by said first search unit and device specification information of the network device searched for by the second search unit are the same, that the network device specified by the device specification information is compliant with both the first communication protocol and the second communication protocol;

a setting unit constructed to set a network address in a format of the first communication protocol or a format of the second communication protocol for communicating with the network device compliant with both the first communication protocol and the second communication protocol, in installing a device control program for the network device compliant with both the first communication protocol and the second communication protocol; and a security printing right determination unit constructed to determine, on the basis of information on a user for whom the device control program is installed, whether the user has a security printing right, wherein said setting unit sets, when said security printing right determination unit determines that the user has the security printing right, a network address in the format of the second communication protocol, and wherein the cipher communication function of the second communication protocol is used for the security printing.

2. The apparatus according to claim 1, wherein when a device control program having a set network address has already been installed, said setting unit sets the set network address for a device control program to be newly installed.

3. The apparatus according to claim 1, wherein when said security printing right determination unit determines that the user does not have the security printing right, said setting unit sets a network address compliant with a communication protocol requiring a shorter information acquisition time out of an information acquisition time taken to acquire device identification information by the first communication protocol and an information acquisition time by the second communication protocol.

4. The apparatus according to claim 1, wherein when executing printing using the cipher communication protocol, said setting unit sets a network address used to communicate with the network device as a network address compliant with the second communication protocol.

5. The apparatus according to claim 1, wherein the first communication protocol includes Internet Protocol Ver. 4, and the second communication protocol includes Internet Protocol Ver. 6.

6. An information processing method executed by an information processing apparatus, comprising:
a first search step of searching for a network device which has a function of communication by a first communication protocol and to which a network address has been set, wherein the first search step performs the search based on the first communication protocol;
a second search step of searching for a network device which has a function of communication by a second communication protocol and to which a network address has been set, wherein the second search step performs the search based on the second communication protocol, and wherein the second communication protocol has a cipher communication function;
a determination step of determining, when device specification information of the network device searched for by the first search step and device specification information of the network device searched for by the second search step are the same, that the network device specified by the device specification information is compliant with both the first communication protocol and the second communication protocol;
a setting step of setting a network address in a format of the first communication protocol or a format of the second communication protocol for communicating with the network device compliant with both the first communication protocol and the second communication protocol, in installing a device control program for the network device compliant with both the first communication protocol and the second communication protocol, and
a security printing right determination step of determining, on the basis of information on a user for whom the device control program is installed, whether the user has a security printing right,
wherein said setting step sets, when said security printing right determination unit determines that the user has the security printing right, a network address in the format of the second communication protocol, and
wherein the cipher communication function of the second communication protocol is used for the security printing.

7. The method according to claim 6, wherein in the setting step, when a device control program having a set network address has already been installed, the set network address is set for a device control program to be newly installed.

8. The method according to claim 6, wherein when the user is determined in the security printing right determination step not to have the security printing right, a network address compliant with a communication protocol requiring a shorter information acquisition time out of an information acquisition time taken to acquire device identification information by the first communication protocol and an information acquisition time by the second communication protocol is set in the setting step.

9. The method according to claim 6, wherein when executing printing using the cipher communication protocol, a network address used to communicate with the network device is set by the setting step as a network address compliant with the second communication protocol.

10. The method according to claim 6, wherein the first communication protocol includes Internet Protocol Ver. 4, and the second communication protocol includes Internet Protocol Ver. 6.

11. A computer-readable storage medium which stores an information processing program for causing a computer to execute an information processing method, the information processing method comprising:
a first search step of searching for a network device which has a function of communication by a first communication protocol and to which a network address has been set, wherein the first search step performs the search based on the first communication protocol;
a second search step of searching for a network device which has a function of communication by a second communication protocol and to which a network address has been set, wherein the second search step performs the search based on the second communication protocol, and wherein the second communication protocol has a cipher communication function;

a determination step of determining, when device specification information of the network device searched for by the first search step and device specification information of the network device searched for by the second search step are the same, that the network device specified by the device specification information is compliant with both the first communication protocol and the second communication protocol;

a setting step of setting a network address in a format of the first communication protocol or a format of the second communication protocol for communicating with the network device compliant with both the first communication protocol and the second communication protocol, in installing a device control program for the network device compliant with both the first communication protocol and the second communication protocol, and a security printing right determination step of determining, on the basis of information on a user for whom the device control program is installed, whether the user has a security printing right, wherein said setting step sets, when said security printing right determination unit determines that the user has the security printing right, a network address in the format of the second communication protocol, and wherein the cipher communication function of the second communication protocol is used for the security printing.

* * * * *